Dec. 9, 1958   R. V. MOORE ET AL   2,863,815
NUCLEAR REACTOR

Filed July 22, 1954   7 Sheets-Sheet 1

Inventors
RICHARD VALENTINE MOORE,
JOHN HENRY BOWEN,
By KENNETH HENRY DENT,

Robert B. Pearson
Attorney

Inventors
RICHARD VALENTINE MOORE,
JOHN HENRY BOWEN,
KENNETH HENRY DENT,
By Robert B Larson
Attorney Dec. 9, 1958   R. V. MOORE ET AL   2,863,815
NUCLEAR REACTOR Filed July 22, 1954   7 Sheets-Sheet 4

Inventors
RICHARD VALENTINE MOORE,
JOHN HENRY BOWEN,
By KENNETH HENRY DENT,

Robert B Pearson
Attorney

Dec. 9, 1958 R. V. MOORE ET AL 2,863,815
NUCLEAR REACTOR
Filed July 22, 1954 7 Sheets-Sheet 6

Inventors
RICHARD VALENTINE MOORE,
JOHN HENRY BOWEN,
KENNETH HENRY DENT,
By Robert B Pearson Attorney Dec. 9, 1958   R. V. MOORE ET AL   2,863,815
NUCLEAR REACTOR Filed July 22, 1954   7 Sheets-Sheet 7

Inventors
RICHARD VALENTINE MOORE,
JOHN HENRY BOWEN,
By KENNETH HENRY DENT,
Robert B. Larson
Attorney United States Patent Office 2,863,815
Patented Dec. 9, 1958

2,863,815

NUCLEAR REACTOR

Richard Valentine Moore, Appleton, and John Henry Bowen and Kenneth Henry Dent, Culcheth, England, assignors, by mesne assignments, to the United States of America as represented by the United States Atomic Energy Commission Application July 22, 1954, Serial No. 444,964

2 Claims. (Cl. 204—193.2)

This invention relates to nuclear reactors.

The invention provides, in one form, a natural uranium fuelled nuclear reactor for the generation of electricity on a basis which is estimated at the present time as economic in relation to conventional coal-fired generating stations remote from coal sources. If the plutonium and fission products recoverable from the reactor are also valued the reactor of the invention may well be an economic possibility in any location requiring electrical power.

The nuclear reactor of the invention comprises a pressure vessel containing a moderator structure formed with vertical fuel element channels symmetrically arranged on a regular lattice in groups and with control rod channels also arranged on a regular lattice and each centred on one of said groups, a coolant circuit connected with the pressure vessel above and below the moderator structure, shielding around the pressure vessel, means defining access holes vertically above said control rod channels penetrating through the shielding above the pressure vessel and through the pressure vessel, control rod driving mechanisms surmounting shielding plugs in said holes, means permitting movement of control rod ties through said plugs, closure members sealing said access holes, means for withdrawing said driving mechanisms and plugs from the access holes and means for introducing fuel element charging chutes into the access holes, the chutes being adapted to service said groups of fuel element channels when located in a control rod channel.

The vertical orientation of the reactor has important advantages over the conventional horizontal orientation. First, the moderator structure, which is basically a flat right-cylinder, is supported on its end instead of on its side thus making support within a cylindrical pressure vessel more easily accomplished with a minimum size of pressure vessel for the given moderator size. Second, the support of the pressure vessel can follow known techniques. Third, the control rod system can be arranged to provide gravity fall of the control rods so that failure of the system will be towards safety. Fourth, the reactor need only have the top face accessible for operation of the reactor so that a building providing operating space all round the reactor is no longer required with a consequent saving in capital cost. Fifth, all perforations of reactor, pressure shell, shielding, together with control rods, fuel elements etc. can all lie along parallel axes which greatly simplifies the design when problems of thermal expansions etc. have to be considered.

The invention provides a pressure operated reactor wherein perforations of the pressure vessel are kept to a minimum. This follows from the arrangement of group charging of fuel elements from common access holes which are also used to accommodate control rod driving mechanisms which are readily removable.

A nuclear reactor embodying the invention will now be described with reference to the accompanying drawings wherein.

Figure 1:
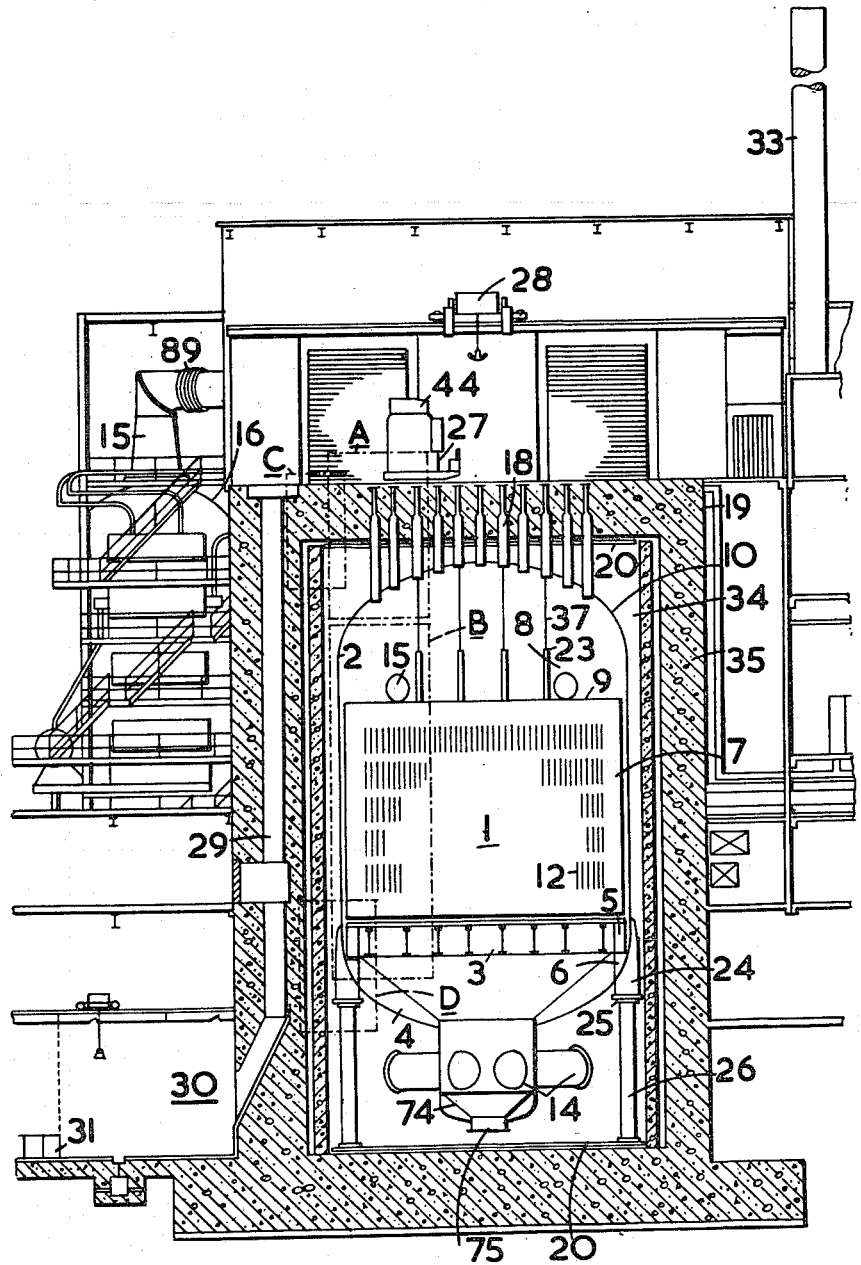
Fig. 1 is a sectional elevation.
Figure 2:
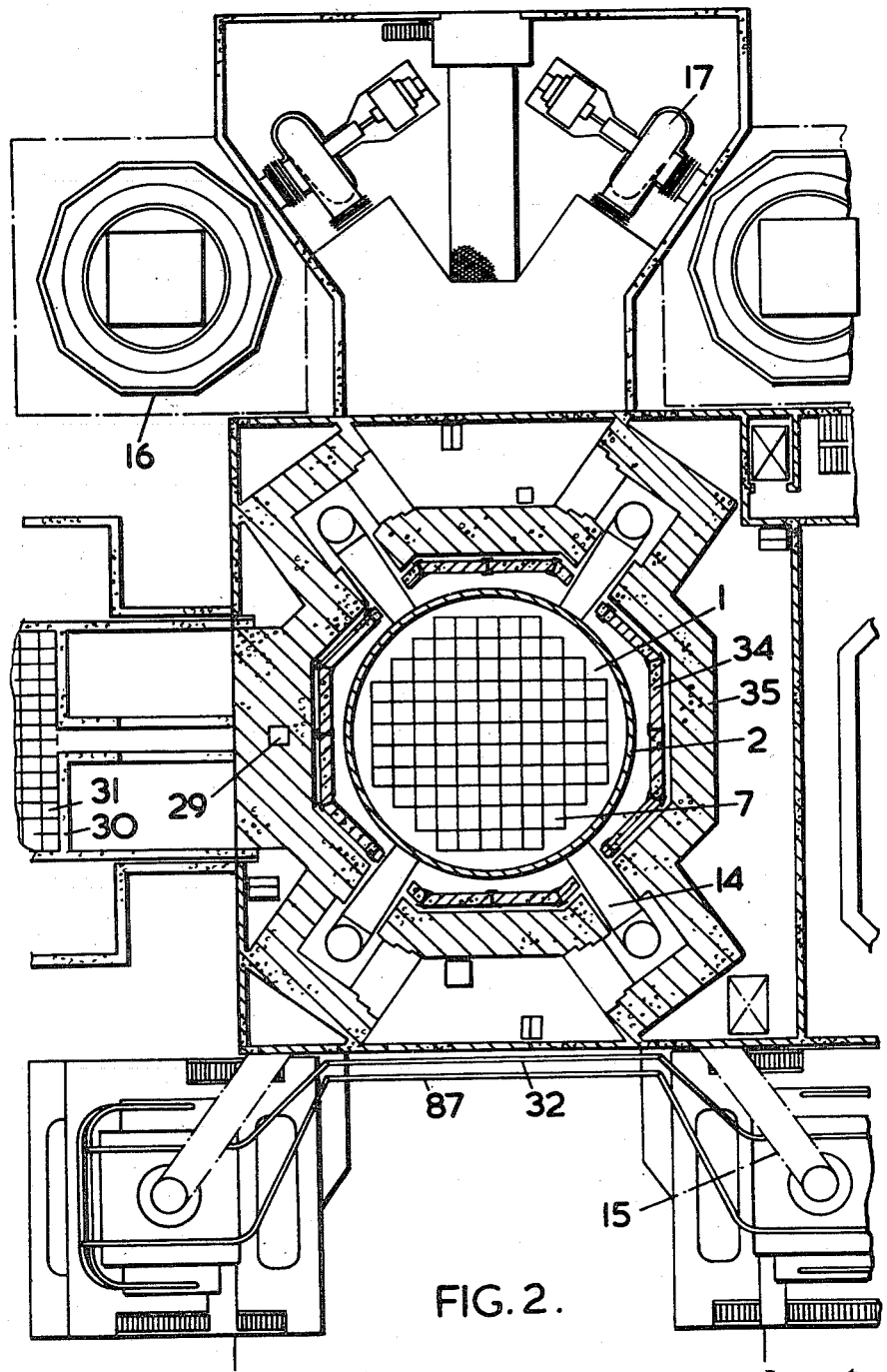
Fig. 2 is a sectional plan.
Figure 3A:
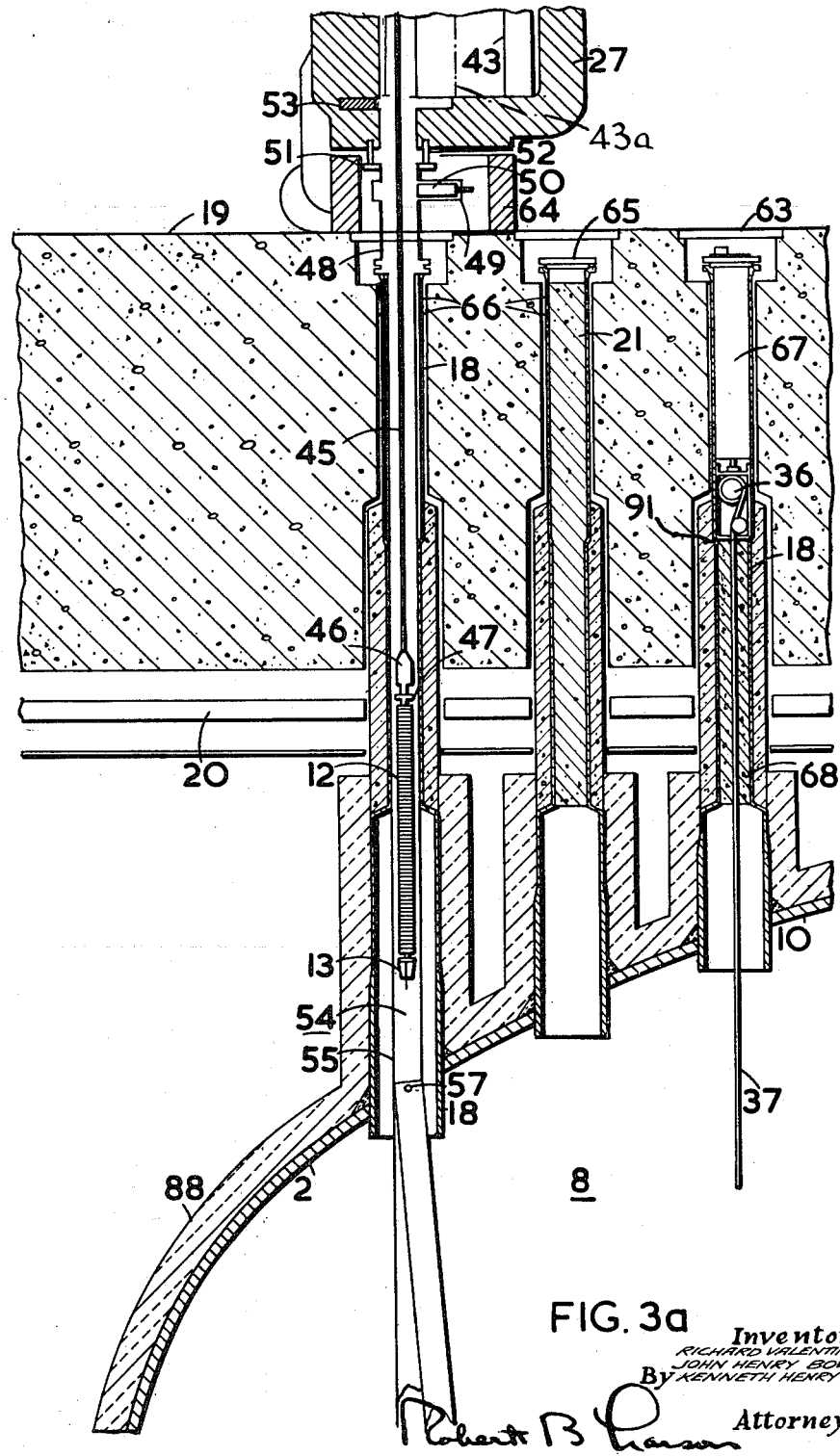
Fig. 3a is an enlarged view of the part in the box A of Fig. 1.
Figure 3B:
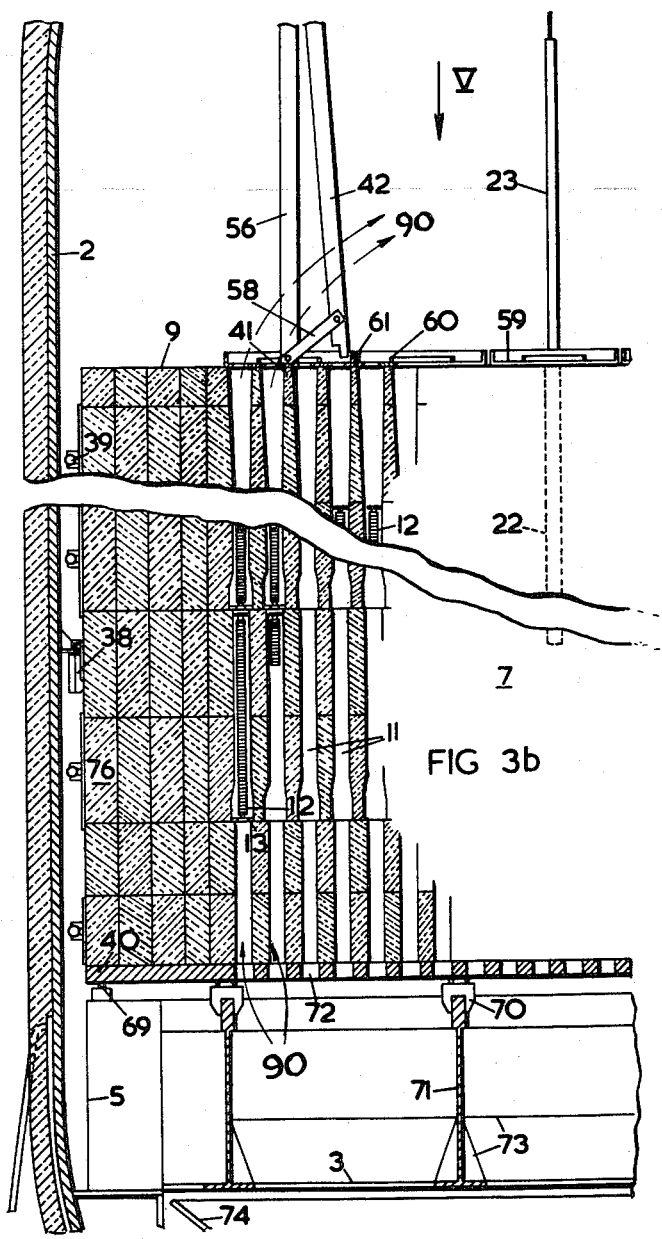
Fig. 3b is an enlarged view of the part in the box B of Fig. 1.
Figure 3C:
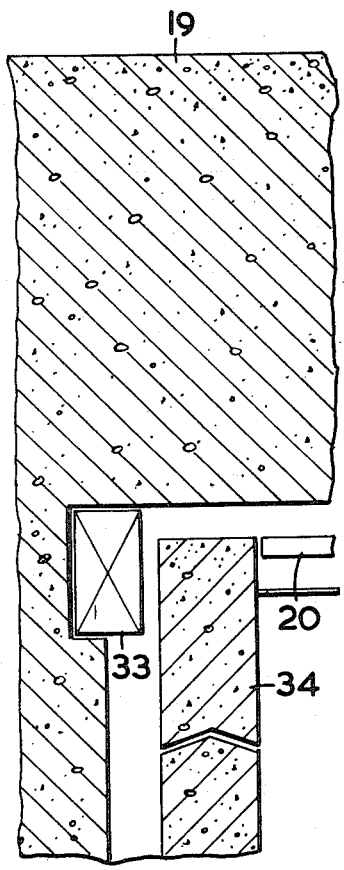
Fig. 3c is an enlarged view of the part in the box C of Fig. 1.
Figure 3D:
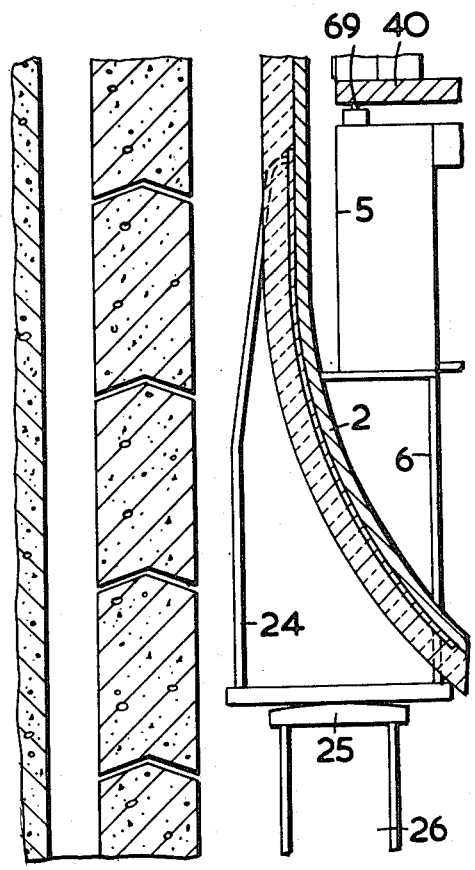
Fig. 3d is an enlarged view of the part in the box D of Fig. 1.

Referring to Figs. 1, 2 and Figs. 3a–d a nuclear reactor 1 comprises a vertical cylindrical pressure vessel 2 having lagging 88 (Fig. 3a) and an internal supporting grid 3 across the base 4 of the vessel resting on a circular ring girder 5 supported on brackets 6 welded to the vessel. A graphite moderator structure 7 is supported on the grid 3 and of a height so as to leave a manipulating space 8 between the top 9 of the moderator structure and the top 10 of the pressure vessel, the moderator structure defining a regular lattice of vertical fuel element channels 11 (Fig. 3b), penetrating through the moderator to contain fuel elements 12 having circumferential fins and individually supported on expandable spiders 13. The spiders 13 provide support for the associated fuel elements 12 by being in their expanded position of Fig. 3b and resting on the tops of the blocks of the moderator structure 7 below the associated fuel elements 12. The spiders 13 and the associated fuel elements 12 can be withdrawn from the moderator structure 7 when the spiders 13 are closed or collapsed as shown in Fig. 3a. A closed pressure coolant circuit for carbon dioxide coolant gas at 100 p. s. i. g. is provided comprising four inlet ducts 14 below and four outlet ducts 15 above the moderator structure, four heat exchangers 16 (Fig. 2) and four single stage centrifugal blowers 17 (Fig. 2) to circulate the coolant gas. Vertical access tubes 18 pass through the top biological shield 19 and top thermal shield 20 into the pressure vessel. The tubes 18 are plugged with concrete plugs 21 (Fig. 3a) and sealed by sealing rings 66. Each tube 18 is centred about a group of sixteen fuel element channels 11. Control rod channels 22 (Fig. 3b) are provided immediately under the access tubes 18. These channels 22 serve to accommodate control rods 23 and they also provide sockets in which a spigot 41 of a charging chute 42 can be located.

The pressure vessel is supported on brackets 24 (Fig. 3d) occupying a similar position outside the pressure vessel as brackets 6 occupy inside the vessel. The brackets 24 rest on supports 25 on rocking pillars 26.

The charging/discharging gear for the fuel elements comprises a magazine 43 (Fig. 3a) in a flask 27 movable over the top of the biological shield 19. The upper compartment 44 (Fig. 1) of the flask 27 encloses a winch and motor which drives a cable 45 terminated by an electromagnetically operated grab 46 shown in Fig. 3a, supporting a fuel element 12 by a top spider 47, the bottom spider 13 being shown in the closed position. The access tube 18 has fitted to it an extension tube 48 fitted with a valve 49 having a gate 50 filled with lead to absorb radiation. The flask 27 is sealed to a flange 51 on the tube 48 by a sealing ring 52 and a slide 53 is provided to close the bottom of the flask. A shield 64 is also provided. When a magazine is charged with used elements it is moved to a discharge well 29 (Fig. 1) in the side shield 35 where it is lowered down the chute into a pond 30 of water to be stored in numbered compartments 31 until ready for movement to the processing plant. A hoist arrangement 28 is available to discharge and charge magazines 43 from the flask 27. The access tube 18 has fitted into it, for charging and discharging operation, a charging device 54 consisting of an outer tube 55 from which can slide a spigot carrying member 56 terminated with the spigot 41 and the charging chute 42 hinged at pin 57 so that it can nestle in the member 56 or swivel away over a fuel element channel. The chute 42 is moved by gas pressure, a piston being contained in the spigot 41 to drive a strut 58. The limits of movement of member 42 are determined by location plates 59 each covering an area of the top face 9 of the moderator structure 7 equivalent to that occupied by sixteen fuel element channels 11. The function of these plates is better understood by reference to Fig. 5. Each plate has an inner lip 60 and an outer lip 61, the lip 60 having an opening 62 to allow the chute 42 to pass in or out so that channels may be charged with a single insertion of the spigot 41.

The control system for the reactor comprises rods 23 (Fig. 3b) in the form of boron steel tube (2% boron) filled with graphite. The tubes are two inches outside diameter and 1/8" thick; their length is 16'3", their weight is 75 lbs. and their travel is 16'6". They are moved by an electric drive unit 67 incorporating a gear box driving a winch 36 and cable ties 37. The speed of travel in the upward direction lies in the range 0.3 to 1.3 mm./sec. The speed of travel in the downward direction is ten times the up-speed. The unit 67 incorporates an electromagnetic drive so that the rods can be released to drop under gravity by deenergisation of the drive and hence the rods function also as shut-off rods. The control rod drive, gearbox and winch are assembled to fit into an access tube 18. The part of the tube not so fitted has a shielding plug 68 through which the cable tie 37 passes.

The graphite moderator structure 7 (Fig. 3b) consists of five layers of vertical graphite blocks 76 supported on a bed plate 40. The bed plate consists of four inch thick square plates each four foot square and supported on levelling screws 69 bearing on heads 70 associated with the girders 71 of the internal support grid 3. The plate 40 has apertures 72 locating with the fuel element channels 11. Deflectors 73 are associated with the girders 71 and a chute 74 (Fig. 1) is provided leading to a base door 75 so that anything passing completely through a fuel element channel will fall to be collected at the base door.

Figure 4:
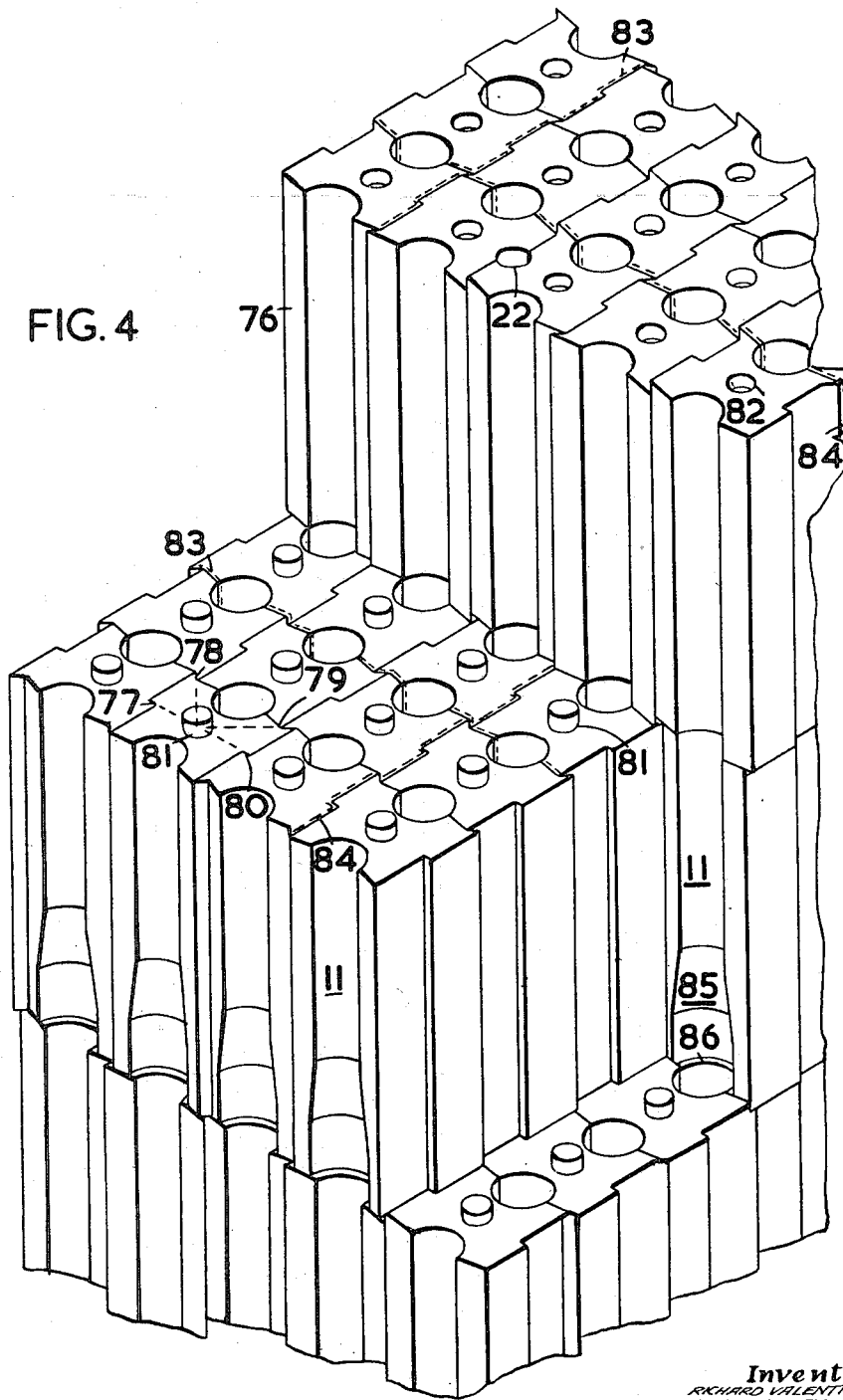
Fig. 4 is a perspective view showing the construction of the graphite moderator structure.

The graphite moderator structure 7 is shown in more detail in Fig. 4. Each block 76 has four mating faces, namely faces 77, 78, 79 and 80. These faces are cut so that their planes intersect along the line of the longitudinal axis of their block which is defined at each end by a dowel 81 or a socket 82. This longitudinal axis remains fixed despite thermal and Wigner growths and it determines the lattice pitch of the reactor which is eight inches. Wigner growth is allowed for on the non-mating faces of the blocks, the blocks being machined so that the gaps between the non-mating surfaces varies from about 0.080 inch at the centre of the graphite structure to zero at the outside, the gradation of the size of gaps being related to the neutron flux which causes the Wigner growth. The blocks 76 are stacked in alternate layers such that each layer has rows of blocks which are "unlocked" along one direction as indicated by the dotted overlines 83 and has columns of blocks which are "interlocked" along one direction as indicated by the dotted overlines 84. By arranging lines 83 (and 84) parallel in each layer but normal to each other in adjacent a rigid structure is obtained. Three inch diameter control rod channels 22 are provided which extend sixteen feet into the reactor core. The fuel element channels 11 are shaped with a throat 85 so that with the graphite block immediately below the throat a ledge 86 is formed on which rests the fuel element support spider 13. Thermal expansion differences between the steel supporting structure and the graphite is allowed for by mounting each vertical string of five graphite blocks on a ball thrust bearing leaving a limited movement slightly greater than that of the differential expansion between the steel and graphite. (The graphite expansion is less than that of steel.)

The graphite moderator structure 7 is in the form of a twenty-four sided right prism and restraint ties 39 (Fig. 3b) are provided around the structure each having temperature compensation means to keep the graphite under substantially constant hoop compression over its operating temperature range. Any tendency for the structure 7 to move away from its correct coaxial position or to rotate about its axis relative to the pressure vessel is prevented by locating struts temperature compensated. To prevent coolant gas by-passing the fuel element channels by passage in the annular space between the structure 7 and pressure vessel 2 and seal 38 is provided which comprises, for each side of the graphite structure prism a thin sheet, flap-hinged along the upper edge and weighted to press against the side of the moderator.

Steam generation takes place in four heat exchangers 16 (Fig. 2) working in parallel both on the reactor gas side and the steam side; the steam passing to turbines by pipes 32 and 37.

The sequence of fuel element charging and discharging operations is as follows. When the reactor has cooled to a temperature of about 200° C. the gas pressure in the reactor is let down by discharging through the stack 33 until it is a few inches water gauge above atmosphere. The cover plate 63 is removed and, in the case of access holes not fitted with winch 36 and drive unit 67, the closure member 65 is also removed. The extension tube 48 is connected with access tube 18. Referring first to the case where mechanism 36 and unit 67 are not fitted, the concrete plug 21 is lifted out until clear of the valve 49 which is closed before the plug 21 is completely withdrawn from the tube 48. The plug 21 is stored in a mortuary hole provided for the purpose. The telescopic charging device 54 is placed in the extension tube 48, the valve 49 is opened and the charging device lowered into place. The piston in spigot 41 is energised and chute 42 swings out to rest against lip 60. Angular location over a channel 11 is determined by an external gauge. The shield 64 is next placed in position and remote drives for operating the valve 49 and rotating the chute 42 are connected. The flask 27 is next brought into position and the sealing ring 52 made to seal flask 27 with flange 51. The flask is evacuated and filled with clean gas at the same pressure as that existing in the reactor. The valve 49 is opened and the grab 46 is lowered to pick up the fuel element 12 and to place it in the magazine 43. The slide 53 is closed, the element 12 is released from the electromagnetic grab 46 and the magazine is rotated. The slide 53 is reopened and the process repeated until one channel is emptied of fuel elements. The chute 42 is then rotated to appear over the next channel lying around the inner lip 60. When the four inner channels have been cleared they are reloaded. The charging device is then rotated so that chute 42 passes through the opening 62 and comes to rest against the outer lip 61 when the twelve outer channels can be cleared and reloaded.

In the case where a winch 36 and unit 67 are fitted, the two parts, together with cable ties 37 and control rod 23, are lifted out until the mechanism 36 is above the shield 19 when it can be detached from the cable which is held whilst the mechanism 36 and unit 67 are removed. The cable tie 37 is then pulled out until the control rod reaches the plug 68. Withdrawal continues until the base of plug 68 or the top of the control rod 23 emerge from the shield 19 when the cable 37 can be released from the control rod whilst the control rod is held. The control rod is then attached to the end of the charging chute 42 which is lowered into the reactor and charging proceeds as described above.

Figure 5:
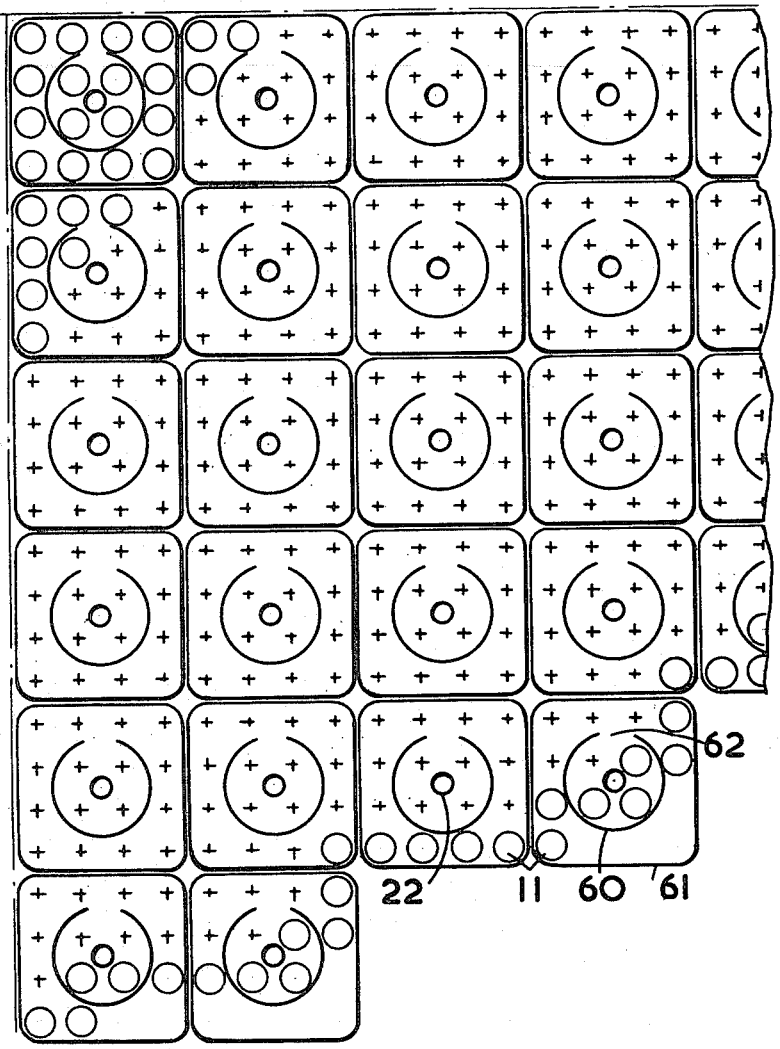
Fig. 5 is a plan view on a part of the moderator structure as viewed in the direction of the arrow V in Fig. 3b.

The charging mechanism described above provides certain characteristics. The charging is performed from one face only of the reactor thus avoiding the costly arrangements which would be required and difficult to achieve for dual face charging in a vertical reactor. The square lattice arrangement of access tubes, control rod and fuel element channels simplifies the structural steel work and allows simple rail tracks to be devised for charging flasks 27. The number of access tubes in the charging face is one hundred and twelve, eighty eight of which are each centred in a complete group of sixteen channels and twenty four of which are each centred over edge groups containing varying numbers of channels as shown in Fig. 5. The total number of fuel element channels is 1704. The charging device 54, being of telescopic constructions, reduces lift height above the reactor and allows for variations in distances to the face 9 of the moderator structure which may well vary in the lifetime of the reactor. Two flasks 27 are provided for a recharging operation, one for charging and one for discharging. The discharge flask is shielded with 12 inches of lead; the charging flask is unshielded. The capacity of a magazine in one flask is twenty elements thus allowing the recharging of four channels at a time. The flasks are made gas tight.

Some miscellaneous features of the reactor are now mentioned.

The selection of carbon dioxide as a coolant gas has advantages in that it is cheap and plentiful with negligible adsorption of thermal neutrons and consequently so little activated that it can be discharged to atmosphere through the stack 33 without creating a radioactive hazard. It is not a chemically inert gas however and a measure of reaction with the graphite and steel structural work is to be expected. Substantial reaction between $CO_2$ and pure magnesium occurs at temperatures of about 550° C. and reaction with uranium will occur should exposure to that metal inadvertently take place.

Neutron economy in a reactor is always an important consideration in the reactor design. In the reactor described in this specification economy is effected by using a graphite of relatively low cross section (4.00 millibarns), a low cross section canning material for the nuclear fuel and use of carbon dioxide as coolant.

The selection of magnesium alloyed with small quantities of beryllium as a canning material is advantageous in that the substance is plentiful and comparatively cheap, it has a low thermal neutron capture cross section (.00259 as compared with .013 for aluminium), it does not react with uranium at the operating temperatures. Magnesium has a larger coefficient of expansion than uranium.

Particular design features of the reactor are as follows:

*Uranium charge.*—100 tonnes of natural uranium in 8520 fuel elements each four feet in length; that is five elements per channel and 1704 channels. (130 lbs. per channel.)

*Graphite.*—A machined weight of 1,140 tonnes providing a twenty-four sided prism 27 feet high and 36 feet across having 1704 four inch diameter fuel element channels on an eight inch pitch in a 31 foot circle, 112 symmetrically placed sockets for locating charging gear, thirty of which are adapted to accommodate combined control and shut-off rods. The volume of the graphite is 23,440 cubic feet.

*Pressure vessel.*—37 feet diameter made of two inch thick steel plate welded on site and stress relieved, care being taken to ensure that the cobalt content is as low as practicable to reduce activation of the vessel. The volume of the vessel is 56,200 cubic feet.

*Coolant gas.*—Carbon dioxide at 100 p. s. i. g. having an inlet temperature of 180° C. and an outlet temperature of 350° C. circulated at the rate of 1,800 lbs./second with a 3 p. s. i. pressure drop across the reactor and removing 143.7 M. W.: the total weight of gas in the system is 23.2 tons.

*Fuel elements.*—These operate at a rating of 2.74 M. W./tonne and have a maximum surface temperature of 400° C. The fissile element is four feet long, and has a diameter of one inch. The magnesium-beryllium alloy (0.05% beryllium) can has an internal diameter of 1.007 inches and external diameter of 1.132 inches and circumferential fins having a fin tip diameter of 2.125 inches. The fins have a thickness of 0.027 inch and a pitch of 0.125 inch.

*Heat exchangers.*—Each exchanger offers 95,105 sq. ft. surface area for heat transfer, 12,680 for superheaters, 63,400 for evaporators, and 19,025 for feed water heating. The gas volume of each exchanger is 14,000 cubic feet and the pressure drop is 1.0 p. s. i. The heat going into steam is 147 M. W. The steam flow is 438,500 lbs./hr. at 335° C.

*Heat balance.*—The reactor produces 143.7 M. W. and the circulators put in 3.97 M. W. making a heat in total of 147.67 M. W. The gross electrical output is 42.5 M. W.; there is 1.4 M. W. heat loss in reactor heat exchangers and turbine and 103.77 M. W. rejected to condensers etc. Allowing 7.14 M. W. for circulators and auxiliaries the net electrical output is 35.36 M. W. representing overall plant efficiency of 24.6%.

The design, construction and erection of the heat exchangers (which are 17'6" in diameter and 69'6" long) does not depart substantially from established practice met for pressure vessels in oil refineries. The exchange surface is made up from 2" O. D. mild steel tubing in the form of multi-loops through which the steam and water pass. Extended surfaces are obtained by welding on to the tubes elliptical-section studs. Water is driven through the evaporator sections by submersible electric pumps which maintain a circulation rate of four times the steam output. Each evaporator has a single 48" x 15' drum containing conventional cyclones and scrubbers. All joints are made outside the heat exchangers to reduce the risk of water leakage into the coolant gas circuit. This requires that the tubes pass through the shell of the heat exchangers so that leaks normally encountered will be to the atmosphere. The headers are likewise outside the shell. Thermal sleeves are provided where the tubes pass through the shell which combined with the loop construction prevent undue thermal stresses. The heat exchangers are lagged and protected for outdoor operation.

The main coolant gas duct-work is by 4'6" diameter pipes of mild steel. Isolating valves are provided in hot and cool ducts and the valves have glands sealed by carbon dioxide at high pressure. The isolating valves are backed by butterfly valves so that complete isolation of heat exchangers and circulators from the reactor is assured by exhausting the gas between isolating and butterfly valves.

Thermal expansion in the ducts is taken on hinged bellows 89 wherein the thrust due to internal pressure is taken on pin joints and flexibility is obtained from bellows fabricated by welding from 3/16" rolled steel plate.

The circulators are of two single stage centrifugal type having a single bearing and shaft rigid with that of a D. C. driving motor also having a single bearing.

The radiation shielding forms a convenient load carrying structure round the reactor. The shielding can be considered in three main sections. The first is the outer or biological shield 19 and 35 which is six feet thick and of reinforced Portland cement concrete with gravel aggregate. This shield has to absorb the radiations incident upon it to a degree that will allow normal working to take place in the vicinity of the reactor when the reactor is operating. The second section is the vertical thermal shield 34 consisting of 1'6" cement blocks encased in ¼" mild steel. This absorbs about 90% of the radiations incident upon it and consequently becomes heated and requires cooling by constant air circulation drawn off through ducts 33 (Fig. 3c) which are coupled with the stack 33. The third section is the top and bottom thermal shield 20 consisting of 4" thick mild steel. The second and third sections constitute an overall thermal shield to protect the outer concrete shield from excessive heating.

In order to make the reactor safe to operate at all time all the excess $k$ is invested in a control rod system with a very low velocity of withdrawal from the reactor. The velocity has been selected by consideration of safe start-up from a full shut-down and compensation of the self-induced reactivity changes within the reactor. It is so low that even under the severe fault condition of all the rods travelling out together this condition would have to be maintained for ¼ hour before the temperature of the fuel elements rose by 100° C.

This slow release of $k$ is inadequate for normal plant control such as changing power and a quick-acting system is provided for this purpose. The range of $k$ is controlled by this system, however, is strictly limited, the actual maximum value being fixed so that if the full excess $k$ of this system was released suddenly under conditions of mal-operation or fault, the reactor would stabilise under the uranium temperature coefficient within a safe temperature rise of the fuel elements.

The inherent safety of the plant is very much increased by the adoption of a coolant with a negligible absorption cross section for thermal neutrons. This means that should the system lose pressure for any reason negligible evcess $k$ is released, and the tendency of the uranium temperature to rise will cause the $k$ of the reactor to fall below unity so assisting the shut-down under the control/shut-off rods which of course would be immediately triggered under these conditions of fault. Parallel supply to the main circulators is from the turbo-alternator and from the public supply so that failure of all four circulators simultaneously is most unlikely to occur. Such an event, would, of course, initiate a prompt shut-down of the reactor and an auxiliary cooling circuit is provided to remove the prolonged heat generation due to the delayed neutron effect and the fission products.

The auxiliary circuit consists of a conventional filter, heat exchanger and circulator connected directly across the reactor pressure vessel, the circulator being supplied direct from an electric battery backed up by a diesel-generator. The circuit is designed to remove the residual heat after shut-down and is capable of maintaining the temperature inside the reactor at a sufficiently low level to permit unloading the fuel elements after the system pressure has been reduced to one atmosphere.

The filter is designed to trap solid fission products or uranium oxide such as might pass into the gas stream following a puncture of the fuel element casing, thus preventing contamination of the external circuit or uranium channels in the reactor not containing the faulty fuel element. The heat exchanger for this circuit is a conventional gas cooler with water circulating through tubes across the gas stream.

With the design of gas-cooled uranium channel adopted, the clearance between the fuel elements and channel walls is so large that a complete channel blockage with subsequent widespread over-heating does not seem possible. Fuel element failure arising from an initially small puncture of the can appears the more likely possibility and means are provided to detect any such occurrences.

For detection of faulty fuel elements, samples of the gas from each group of 16 uranium channels (i. e. one loading cluster) are piped to the outside of the reactor where group selection in sequence takes place by means of an automatic sequence timer which synchronizes the operation of solenoid valves with the operation of the detecting machines. The gases are fed over a wire on which solid decay products are deposited and the wire is periodically fed through a counter tube connected with a recorder and alarm circuit.

Sensitivity will depend upon the background due to the uranium dust on the outside of the cans. Assuming this to be 5 microgrammes/foot run, estimated figures are 0.1 cm.² to 1.0 cm.² of bare uranium detectable in maximum and minimum flux regions respectively. Employing four detecting machines it is possible to scan the complete reactor with a cycle time of 30 minutes. Should a faulty fuel element be detected the reactor is shut-down and the $CO_2$ pressure reduced to 1 atmosphere, the access hole associated with the burst is opened and a flexible tube for sampling introduced through a charging chute. The reactor is then run on low power on the auxiliary circuit and the chute indexed to each channel in turn until the faulty channel is located.

The design of the reactor described above is made on the basis that natural uranium is used as the nuclear fuel. If enriched uranium is used (enrichment factor of 1.035) "flattening" of the reactor can take place to give a more uniform radial distribution of neutron flux and hence a greater heat output. The temperature of gas discharge from all channels would then be appropriately the same with the same gas flow in each channel.

We claim:

1. A nuclear reactor comprising a pressure vessel containing a moderator structure formed with vertical fuel element channels symmetrically arranged as a regular lattice in groups and with control rod channels also arranged on a regular lattice so that each control rod channel is centered on one of said groups, control rods movable in said control rod channels, fuel elements in said fuel element channels, means defining apertures in said pressure vessel above and below said moderator structure to provide for the passage of a coolant through said fuel element channels and hence over the fuel elements, shielding around the pressure vessel, means defining access holes penetrating the shielding and the pressure vessel vertically above said control rod channels, apertured removable shielding plugs in said access holes, removable control rod driving mechanisms above said plugs, control rod ties between said mechanisms and said control rods passing through the apertured plugs, removable closure members sealing said access holes, means for removing said closure members and withdrawing said driving mechanisms and plugs from the access holes and means for introducing fuel element charging chutes into the access holes, the chutes being adapted to service said groups of fuel element channels when located in control rod channels.

2. A nuclear reactor as claimed in claim 1 wherein each of said groups of fuel element channels contains sixteen channels arranged four by four and plates on the top face of the moderator structure centered on said groups of sixteen channels, the plates being shaped to guide said charging chute round the four inner channels and then the twelve outer channels.

References Cited in the file of this patent

UNITED STATES PATENTS 2,708,656    Fermi et al. _____ May 17, 1955

OTHER REFERENCES

Nucleonics, November 1951, pages 5–17.
Atomics, August 1953, pages 183–186.